United States Patent
Jung et al.

(10) Patent No.: US 10,337,925 B2
(45) Date of Patent: Jul. 2, 2019

(54) METHOD FOR ESTIMATING LAND SURFACE TEMPERATURE LAPSE RATE USING INFRARED IMAGE

(71) Applicant: University of Seoul Industry Cooperation Foundation, Seoul (KR)

(72) Inventors: Hyung Sup Jung, Seoul (KR); Sung Hwan Park, Seoul (KR)

(73) Assignee: University of Seoul Cooperation Foundation, Seoul (KR)

( * ) Notice: Subject to any disclaimer, the term of this patent is extended or adjusted under 35 U.S.C. 154(b) by 387 days.

(21) Appl. No.: 14/966,369

(22) Filed: Dec. 11, 2015

(65) Prior Publication Data

US 2016/0097679 A1    Apr. 7, 2016

Related U.S. Application Data

(63) Continuation of application No. PCT/KR2014/005113, filed on Jun. 11, 2014.

(30) Foreign Application Priority Data

Jun. 11, 2013 (KR) .................. 10-2013-0066727

(51) Int. Cl.
 *G01J 5/00*   (2006.01)
 *G01J 5/02*   (2006.01)
 *G01W 1/00*   (2006.01)

(52) U.S. Cl.
 CPC .............. *G01J 5/007* (2013.01); *G01J 5/02* (2013.01); *G01J 5/025* (2013.01); *G01J 5/026* (2013.01);
(Continued)

(58) Field of Classification Search
None
See application file for complete search history.

(56) References Cited

U.S. PATENT DOCUMENTS 3,230,764 A * 1/1966 Bloxsom, Jr. ............ G01K 1/00
                                                        356/128
4,481,517 A * 11/1984 Brown ...................... G01J 9/02
                                                        342/201

(Continued)

FOREIGN PATENT DOCUMENTS

JP    2003-296702 A    10/2003
JP    2007-232652 A     9/2007
(Continued)

OTHER PUBLICATIONS

Jain et al., Determination of land surface temperature and its lapse rate in the Satluj River basin using NOAA data, 2008, p. 3091-3103.*

*Primary Examiner* — Mohammad K Islam
(74) *Attorney, Agent, or Firm* — Mintz Levin Cohn Ferris Glovsky and Popeo, P.C.; Kongsik Kim; Jonathon Western (57) ABSTRACT

A method of estimating land surface temperature lapse rate using an infrared image is disclosed. In the method of estimating land surface temperature lapse rate using an infrared image, a target area for the estimation of land surface temperature lapse rate is selected. The atmospheric transmittance of the target area is calculated. Reference temperature is estimated at a reference location set in the target area as desired. A temperature difference is calculated from the atmospheric transmittance and the estimated reference temperature, and then a temperature difference image is generated. Land surface temperature lapse rate is estimated from the temperature difference image and a Digital Elevation Map (DEM) in an identical area using an elevation-based temperature difference distribution.

5 Claims, 12 Drawing Sheets

(52) U.S. Cl.
CPC ....... *G01W 1/00* (2013.01); *G01J 2005/0077* (2013.01)

(56) References Cited

U.S. PATENT DOCUMENTS

| | | | | | |
|---|---|---|---|---|---|
| 4,611,929 | A | * | 9/1986 | Holyer | G01J 5/007 374/121 |
| 4,965,573 | A | * | 10/1990 | Gallagher | G01P 5/10 244/181 |
| 5,324,113 | A | * | 6/1994 | Ingram, Jr. | G01J 5/007 374/109 |
| 5,524,483 | A | * | 6/1996 | Fons | G01N 33/24 374/112 |
| 6,456,226 | B1 | * | 9/2002 | Zheng | G01S 7/003 342/26 R |
| 6,563,452 | B1 | * | 5/2003 | Zheng | G01S 7/003 342/26 R |
| 9,471,064 | B1 | * | 10/2016 | Boland | G05D 1/104 |
| 2007/0230537 | A1 | * | 10/2007 | Tangborn | G01W 1/00 374/109 |
| 2008/0264164 | A1 | * | 10/2008 | Solheim | G01J 5/02 73/170.27 |
| 2011/0307177 | A1 | * | 12/2011 | Hong | G01N 21/55 702/2 |
| 2012/0155714 | A1 | * | 6/2012 | Douglass | G06K 9/00657 382/110 |
| 2013/0147659 | A1 | * | 6/2013 | Hong | G01S 13/955 342/26 A |
| 2015/0260749 | A1 | * | 9/2015 | Luo | G01C 21/20 701/14 |
| 2015/0309155 | A1 | * | 10/2015 | Belloni | G01S 5/0257 342/451 |
| 2017/0358067 | A1 | * | 12/2017 | Jung | G06T 3/4061 |

FOREIGN PATENT DOCUMENTS

| | | |
|---|---|---|
| KR | 10-2009-0088131 A | 8/2009 |
| KR | 10-1207925 B1 | 11/2012 |
| KR | 101378774 B1 * | 3/2014 |
| WO | WO 2014/200258 A1 * | 12/2014 |

* cited by examiner

August

FIG. 7

September

FIG. 8

October

FIG. 9

August

FIG. 10

September

METHOD FOR ESTIMATING LAND SURFACE TEMPERATURE LAPSE RATE USING INFRARED IMAGE

CROSS-REFERENCE TO RELATED APPLICATION

This application is a continuation of PCT/KR2014/005113 filed on Jun. 11, 2014, which claims priority to Korean Application No. 10-2013-0066727 filed on Jun. 11, 2013, which application is incorporated herein by reference.

TECHNICAL FIELD

The present invention relates generally to a method of estimating land surface temperature lapse rate using an infrared image and, more particularly, to a method of estimating land surface temperature lapse rate using an infrared image, which is capable of estimating land surface temperature lapse rate without automatic meteorological observation equipment.

The present invention has been derived from research carried out as part of the Core Space Technology Development Project that has been sponsored by the Korean Ministry of Education, Science and Technology and the National Research Foundation of Korea [Project Management Number: 1345178484; Project Title: Development of Technique for Extracting and Correcting Ion Effects using Satellite Radar].

BACKGROUND ART

In general, in an alpine area, bad weather, such as sudden heavy rain, heavy snow or a thick fog, may occur unexpectedly due to a drastic change in temperature, unlike in a low-elevation area. When a person who does not have basic knowledge about an alpine area is located in an alpine area at night, he or she has the possibility of experiencing an accident due to sudden bad weather. In an alpine area, a suddenly frozen road may be a cause of a traffic accident. Accordingly, it is necessary to understand a change in temperature attributable to an increase in elevation in an alpine area with respect to each period of a year.

Automatic meteorological observation devices capable of collecting temperature data are intensively distributed in a populated area and are rare in a mountainous area, and have been used for short-term observation over the course of 1 to 2 years because the automatic meteorological observation devices may be easily damaged by wind, heavy rain and heavy snow prominent in an alpine area and also it is not easy to supply power to the automatic meteorological observation devices.

Accordingly, a method of estimating the temperature of a mountainous area from an infrared image has been developed. This is a method of converting the radiant energy of a land surface, collected via an infrared sensor, into temperature, and is advantageous in that the method can observe a wide area, can perform periodic monitoring, can reduce data acquisition costs, and can estimate land surface temperature lapse rate.

Technologies related to the calculation and estimation of land surface temperature are disclosed in Korean Patent No. 1207925 and Korean Patent Application Publication No. 2009-0088131.

A method of calculating land surface temperature and a method and system for estimating a local air temperature taking account of an elevation difference, which are disclosed in Korean Patent No. 1207925 and Korean Patent Application Publication No. 2009-0088131 as related technologies, respectively, are briefly described below.

According to Korean Patent No. 1207925 (hereinafter referred to as "related document 1"), the method of calculating land surface temperature disclosed in related document 1 includes: a meteorological data acquisition step of acquiring meteorological data including at least one of an atmospheric profile at at least one land surface temperature calculation point observed by a meteorological satellite, a satellite zenith angle, emission rate, an emission rate difference, and land surface temperature lapse rate; a land surface temperature calculation point number determination step of determining whether the satellite zenith angle of the meteorological data falls within a predetermined angle and then determining the number of land surface temperature calculation points within the predetermined angle; an emission rate difference calculation step of setting the initial value of first emission rate obtained by detecting the determined land surface temperature calculation points using a first wavelength and the initial value of the second emission rate detected using a second wavelength different from the first wavelength, and obtaining the initial value of an emission rate difference corresponding to the difference between the first emission rate and the second emission rate difference; a predetermined or less value determination step of obtaining the second emission rate by subtracting the first emission rate value from the emission rate difference and then determining whether the second emission rate is less than a predetermined value; a daytime/nighttime/all-based range setting step of setting daytime/nighttime/all-based ranges based on the land surface temperature lapse rate of the meteorological data if, as a result of the determination, the second emission rate is less than a predetermined value; an increased emission rate difference determination step of adding a first predetermined increase value to the emission rate difference, and then determining whether the increased emission rate difference falls within a first predetermined range; an increased emission rate determination step of adding a second predetermined increase value to the first emission rate, and then determining whether the increased emission rate falls within a second predetermined range; and a simulation data generation step of generating daytime/nighttime/all-based simulation data by simulating the land surface temperature using a radiative transfer model.

However, since the method of calculating land surface temperature disclosed in related document 1 measures temperature via the sensor and performs estimation, the estimated temperature is different from a temperature measured via actual measurement due to atmospheric effects and emissivity. The radiant energy radiated from a land surface is attenuated by the scattering, absorption and refraction of the atmosphere and then collected by the infrared sensor, and the emissivity varies with the color, roughness, water content, etc. of the land surface. Accordingly, it is difficult to know emissivity, and thus it is very difficult to estimate accurate temperature from an infrared image.

According to Korean Patent Application Publication No. 2009-0088131 (hereinafter referred to as "related document 2"), the method for estimating a local air temperature taking account of an elevation difference disclosed in related document 2 includes: a digital map generation step of generating a digital map ArcView Shape of a target area, indicating a plurality of observation points on the digital map, storing actually measured air temperature and elevation data on the observation points; a primary air temperature distribution diagram generation step of generating a primary air temperature distribution diagram by forming a plurality of grids by dividing the digital map by a square grid having a predetermined size and calculating the first estimated air temperature value of each of the grids through the Inverse Distance Squared Weighting (IDSW) of the observation points; an actually measured elevation map generation step of generating an actually measured elevation map of the target area as a digital elevation model; a virtual elevation map generation step of generating a virtual elevation map by calculating the virtual elevation of each of the grids of the digital map through the inverse distance squared weighting (IDSW) of the observation points; a correction value generation step of calculating the elevation difference of each of the grids by comparing the actually measured elevation map with a virtual elevation map and generating a correction value by multiplying air temperature lapse rate corresponding to the elevation difference by the elevation difference; and a final air temperature distribution diagram generation step of generating a final air temperature distribution diagram, in which a second estimated air temperature value approximate to the actually measured air temperature value has been indicated, by applying the correction value to the primary air temperature distribution diagram generated at the correction value generation step.

However, the method and system for estimating a local air temperature taking account of an elevation difference disclosed in related document 2 is disadvantageous in that precision is reduced because the estimated value of a local temperature is corrected by applying the temperature lapse rate corresponding to the elevation difference.

SUMMARY OF THE DISCLOSURE

Accordingly, the present invention has been made to solve the above problems occurring in the prior art, and an object of the present invention is to provide a method of estimating land surface temperature lapse rate using an infrared image, which is capable of estimating land surface temperature lapse rate using the relationship between the emissivity and atmospheric effects of land surfaces in an image, thereby being able to be used in various fields, such as the generation of a land surface temperature lapse rate diagram, the precise estimation of a change in temperature attributable to a weather change, the observation of a risk involved with a road in an alpine area, the analysis of the ecological system of an alpine area, etc.

In accordance with an aspect of the present invention, there is provided a method of estimating land surface temperature lapse rate using an infrared image, including: selecting a target area for the estimation of land surface temperature lapse rate; calculating the atmospheric transmittance of the target area; estimating reference temperature at a reference location set in the target area as desired; calculating a temperature difference from the atmospheric transmittance and the estimated reference temperature, and generating a temperature difference image; and estimating land surface temperature lapse rate from the temperature difference image and a Digital Elevation Map (DEM) in the same area using an elevation-based temperature difference distribution.

The estimating land surface temperature lapse rate may include estimating the land surface temperature lapse rate via linear regression analysis.

The estimating land surface temperature lapse rate may include: re-sampling the DEM so that it has the spatial resolution of the temperature difference image; generating elevation-based temperature difference data from the DEM and the temperature difference; and calculating a linear regression curve via the temperature difference data.

The calculating atmospheric transmittance may be performed to minimize the atmospheric effects of the infrared image.

The selecting a target area may include estimating radiant temperature from radiant energy, radiated from a land surface, using an infrared sensor, and then selecting the target area.

The estimating reference temperature may include approximately observing land surface temperature from the infrared image and then estimating the reference temperature, or observing the reference temperature via field observation.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE DISCLOSURE

The terms and words used in the following specification and the attached claims should be interpreted as having meanings and concepts in conformity with the technical spirit of the present invention based on the principle that an inventor may appropriately define the concepts of terms and words in order to describe his or her invention in the best way.

Throughout the specification and the claims, unless explicitly described to the contrary, the terms "include" and "comprise" and their variants, such as "includes," "including," "comprises" and "comprising," will be understood to imply the inclusion of stated components, not the exclusion of any other components. Furthermore, the term " . . . unit"

used in the following specification and the attached claims refers to a unit for processing at least one function or operation, and may be implemented using hardware, software or a combination of hardware and software.

The configuration of a method of estimating land surface temperature lapse rate using an infrared image according to an embodiment the present invention will be described in detail below with reference to the accompanying drawings.

Figure 1:
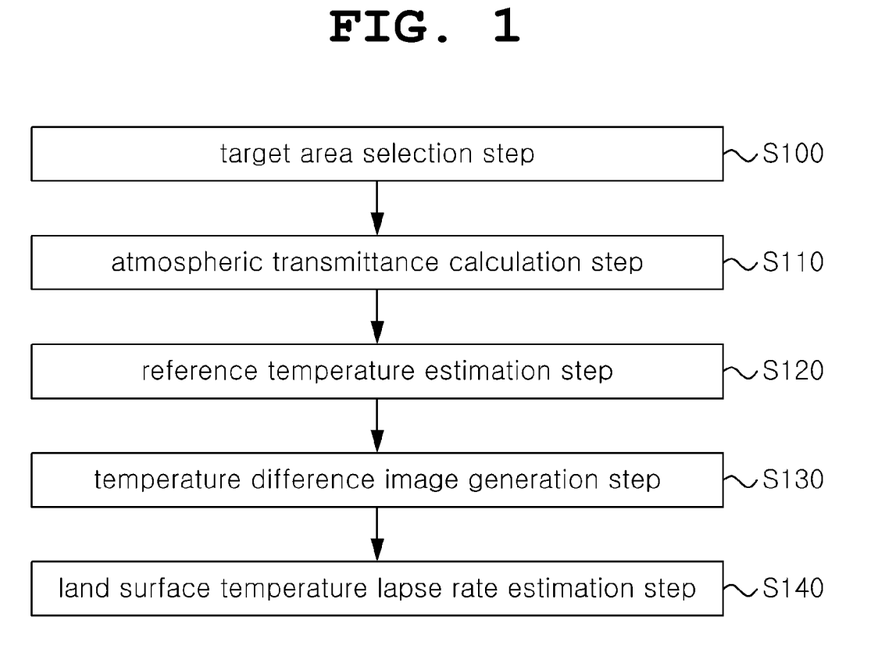
FIG. 1 is a block diagram of a method of estimating land surface temperature lapse rate using an infrared image according to an embodiment of the present invention.
Figure 2:
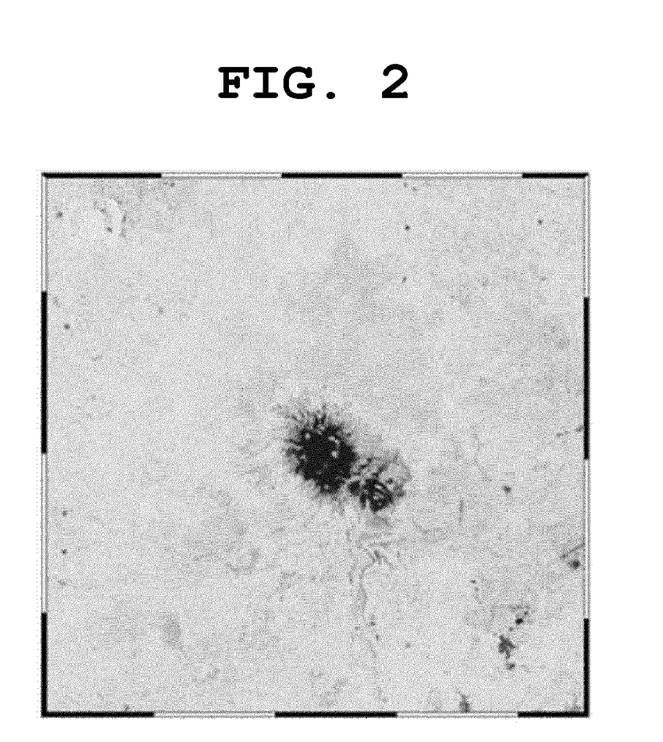
FIGS. 2 and 3 are images of examples of an NDVI image and an extracted target area obtained via the method of estimating land surface temperature lapse rate using an infrared image according to the embodiment of the present invention.
Figure 3:
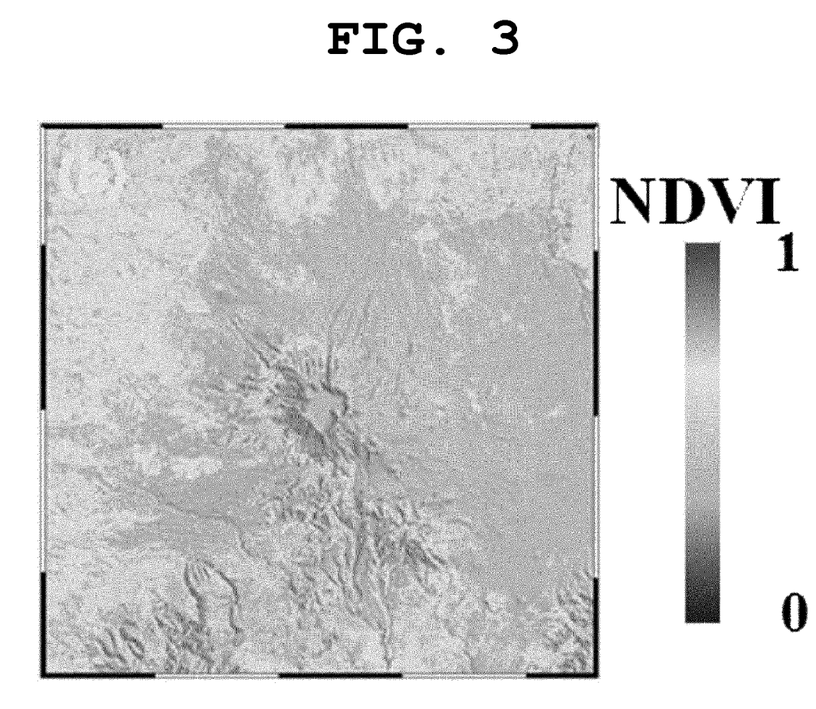
Figure 4:
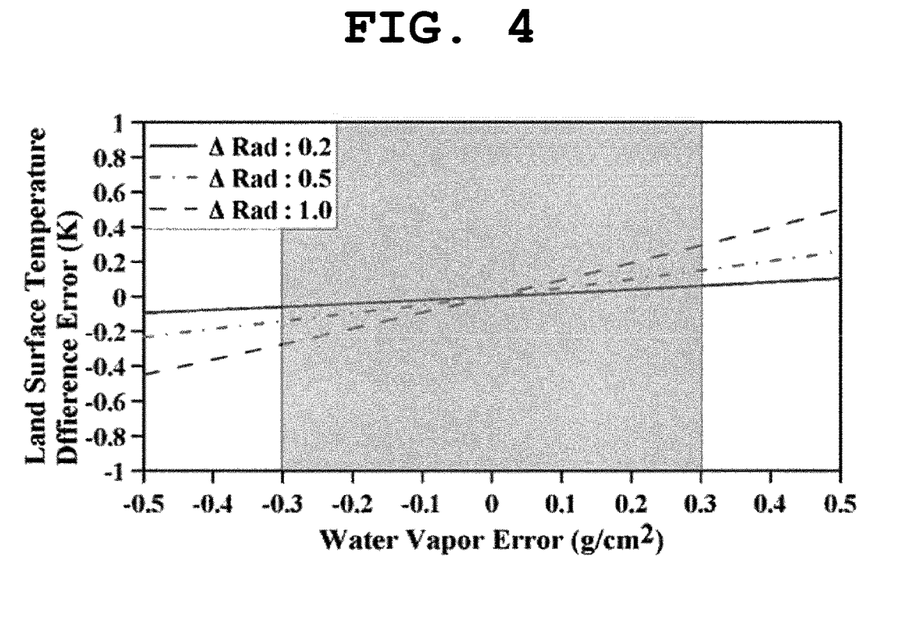
FIGS. 4 and 5 are graphs showing the results of the error sensitivity analysis of temperature differences estimated via the method of estimating land surface temperature lapse rate using an infrared image according to the embodiment of the present invention.
Figure 5:
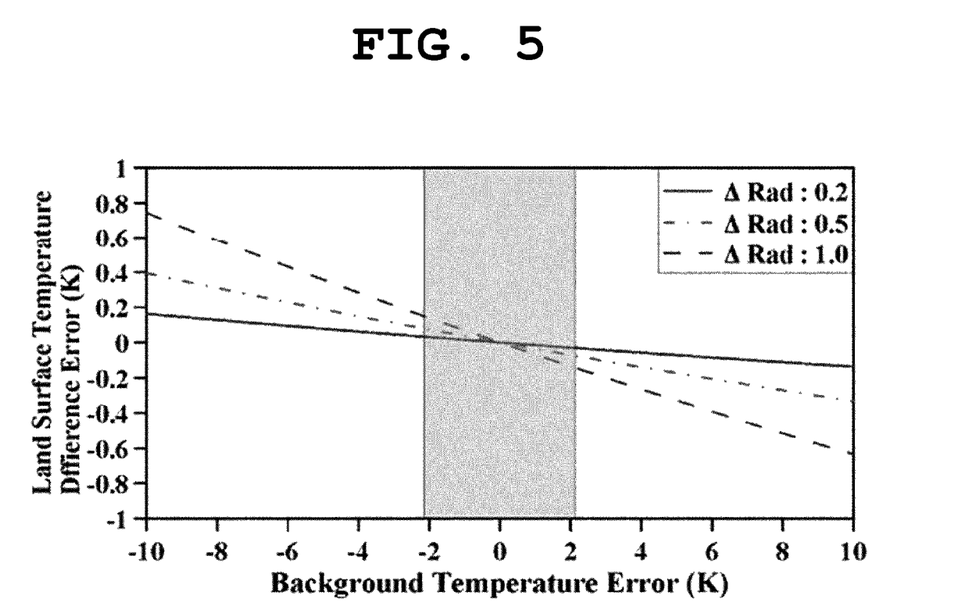
Figure 9:
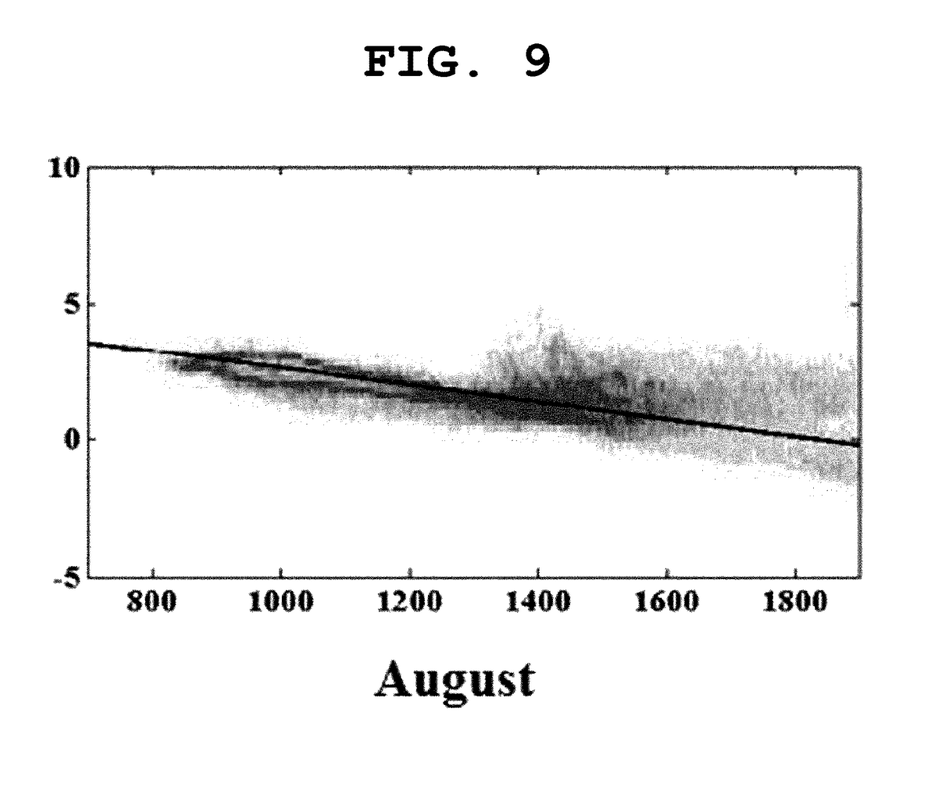
FIGS. 9 to 11 are graphs showing examples of elevation-based temperature difference distributions and land surface temperature lapse rates obtained via the method of estimating land surface temperature lapse rate using an infrared image according to the embodiment of the present invention.
Figure 10:
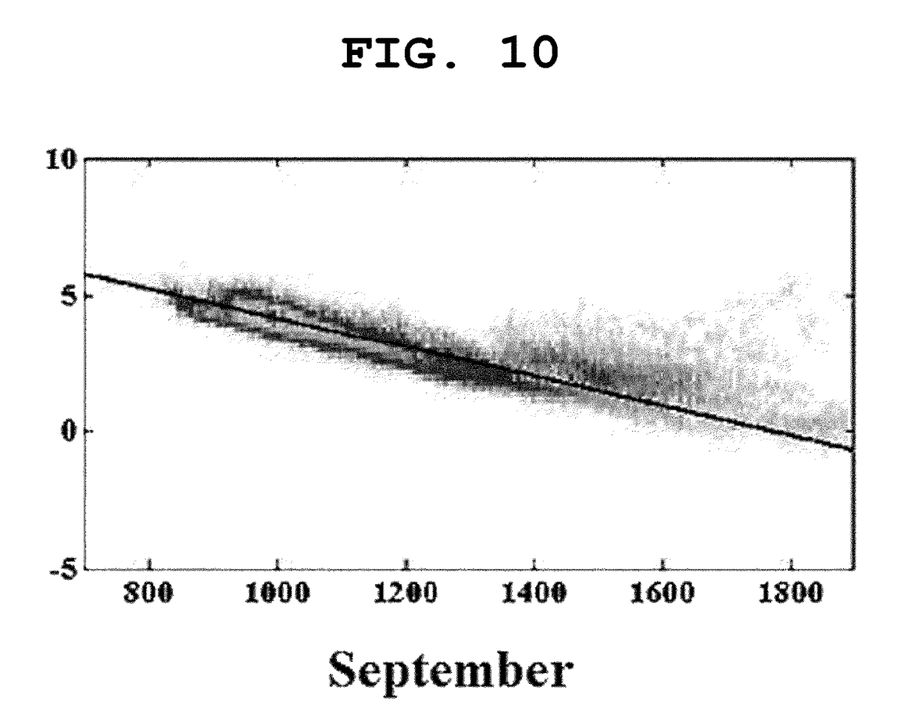
Figure 11:
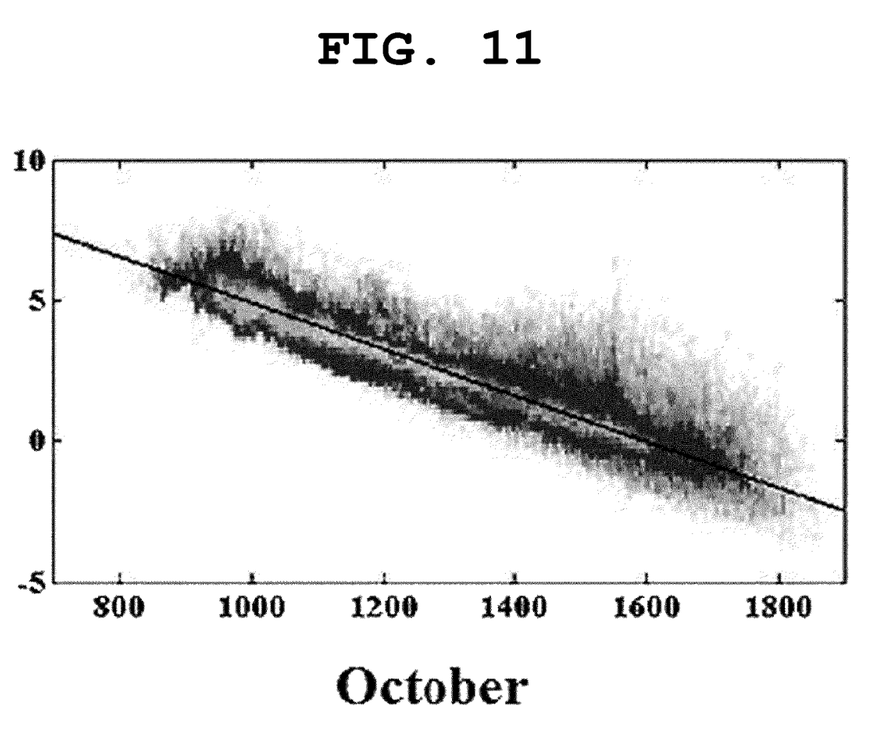
Figure 12:
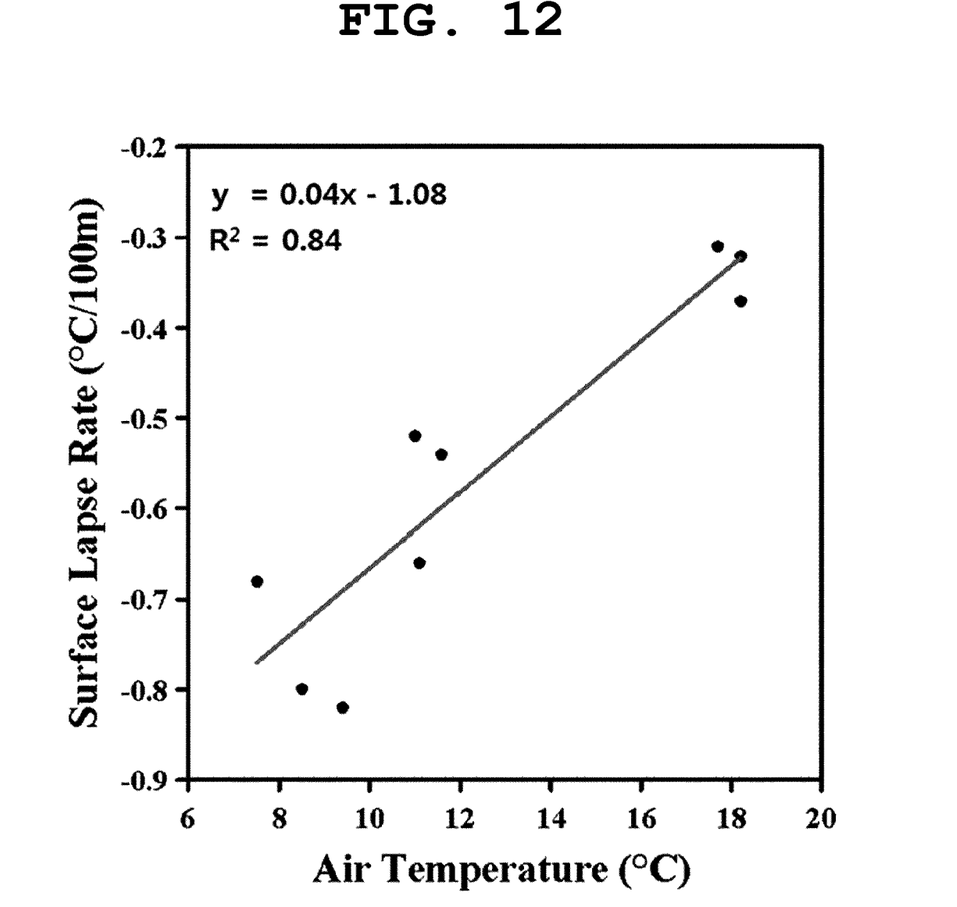
FIG. 12 is a graph showing changes in land surface temperature lapse rate based on air temperature via the method of estimating land surface temperature lapse rate using an infrared image according to the embodiment of the present invention.

FIG. 1 is a block diagram of a method of estimating land surface temperature lapse rate using an infrared image according to an embodiment of the present invention; FIGS. 2 and 3 show examples of an NDVI image and an extracted target area obtained via the method of estimating land surface temperature lapse rate using an infrared image according to the embodiment of the present invention in the form of images; FIGS. 4 and 5 show the results of the error sensitivity analysis of temperature differences estimated via the method of estimating land surface temperature lapse rate using an infrared image according to the embodiment of the present invention in the form of graphs; FIGS. to 8 show temperature difference images generated from infrared images via the method of estimating land surface temperature lapse rate using an infrared image according to the embodiment of the present invention in the form of images; FIGS. 9 to 11 show examples of elevation-based temperature difference distributions and land surface temperature lapse rates acquired via the method of estimating land surface temperature lapse rate using an infrared image according to the embodiment of the present invention in the form of graphs; and FIG. 12 shows changes in land surface temperature lapse rate based on air temperature via the method of estimating land surface temperature lapse rate using an infrared image according to the embodiment of the present invention in the form of a graph.

As shown in the drawings, the method of estimating land surface temperature lapse rate using an infrared image the present embodiment includes a target area selection step S100, an atmospheric transmittance calculation step S110, a reference temperature estimation step S120, a temperature difference image generation step S130, and a land surface temperature lapse rate estimation step S140.

The target area selection step S100 is the step of selecting a target area for the estimation of land surface temperature lapse rate. The target area is preferably a tree-covered area having high emissivity.

That is, the temperature estimated using an infrared sensor during the performance of the target area selection step S100 is a radiant temperature estimated from radiant energy radiated from a land surface, and is different from a directly measured temperature. One of the reasons why the difference occurs results from the emissivity of the land surface. In this case, the emissivity is defined as the ratio of total radiant energy radiated from a black body to total energy radiated from a land surface of the real world at the same temperature.

Since even land surfaces having the same temperature have different emissivities depending on color, surface roughness, water content, etc., a radiant temperature estimated from radiant energy varies. Accordingly, in order to estimate the temperature of a land surface from radiant energy, information about emissivity is essentially required.

Accordingly, the estimation of temperature using radiant energy is chiefly performed in the sea composed of a single object. The temperature estimated in this way is referred to as "sea surface temperature (SST)." In particular, water is more approximate to a black body than other objects, and has an emissivity of about 0.98. Since an object having high emissivity has the characteristic in which a change in temperature is not significant, the object has a characteristic different from the characteristic in which the temperature of the atmosphere changes considerably rapidly with the amount of solar energy and air temperature.

Since the land is composed of various objects unlike the sea, it is difficult to estimate temperature on the land. Accordingly, the temperatures estimated on the sea and the temperature estimated on the land are referred to as separate names. The temperature estimated on the land is referred to as "land surface temperature (LST)." However, a vegetation area (a tree-covered area) has higher emissivity than other objects. The value of this emissivity is about 0.98. Accordingly, the vegetation area is an area having the characteristic in which temperature does not change significantly with the amount of solar energy and air temperature.

When an area in which the temperature of a land surface does not change significantly with the amount of solar energy and air temperature is selected and land surface temperature lapse rate is estimated, the precision of estimation of land surface temperature lapse rate can be increased. Accordingly, it is important to extract a vegetation area from an infrared image first. When a vegetation area is extracted from an image, a normalized difference vegetation index (NDVI) image using the ratio of a red image to a near-infrared image is used. The NDVI image, i.e., NDVI(x,y), is obtained using Equation 1 below:

$$NDVI(x, y) = \frac{\rho_{NIR}(x, y) - \rho_{RED}(x, y)}{\rho_{NIR}(x, y) + \rho_{RED}(x, y)} \quad (1)$$

where $\rho_{NIR}$ and $\rho_{RED}$ are the reflectance of the near-infrared image and the reflectance of the red image, respectively, and x and y are an image coordinate in a pixel direction and an image coordinate in a line direction, respectively.

In particular, when the reflectance of the near-infrared image and the reflectance of the red image are calculated, it is more preferable to include atmospheric correction in the calculation. Atmospheric correction techniques are chiefly classified into an atmospheric model-based atmospheric correction technique and an image-based correction technique. The atmospheric model-based atmospheric correction technique is a method of obtaining transmittance, atmospheric upward radiation and atmospheric downward radiation via an atmospheric model, such as MODTRAN, 6S or the like, and then performing correction, and the image-based correction technique is a method of assuming that an object approximate to a black body is present in an image and then estimating atmospheric effects based on this assumption.

For example, when the NDVI exceeds 0.5, an almost all target land surface may be assumed to be composed of vegetation. When an infrared image in the range from 10.5 to 12.5 is used, the emissivity may be considered to be 0.99. Therefore, at the target area selection step S100, an area having an NDVI equal to or greater than 0.5 is extracted from an NDVI image obtained from Equation 1, and is selected as the target area. FIGS. 2 and 3 show an NDVI image and an extracted target area according to an embodiment of the present invention. FIG. 2 shows an NDVI image generated from Equation 1, and FIG. 3 shows an area having an NDVI equal to or greater than 0.5 at each image coordinate.

The atmospheric transmittance calculation step S110 is the step of calculating the atmospheric transmittance of the target area from air temperature and relative humidity on the day when the infrared image was photographed in order to maximize the atmospheric effects of the infrared image. Although the atmospheric transmittance at the atmospheric transmittance calculation step S110 may be easily calculated using an atmospheric model, the calculation of the transmittance using the atmospheric model requires atmospheric physical quantities. In most cases, it is difficult to know physical quantities, and thus it is not easy to perform the calculation of the atmospheric transmittance using the atmospheric model. Therefore, in most cases, the atmospheric transmittance is calculated from water vapor, and may be calculated using Equation 2 below:

$$\tau = 0.974290 - 0.08007h \text{ (high air temperature)}$$

$$\tau = 0.982007 - 0.09611h \text{ (low air temperature)} \quad (2)$$

where $\tau$ is atmospheric transmittance, and h is water vapor. This water vapor is expressed by Equation 3 below:

$$h = \frac{P_0}{\rho_w \xi} \quad (3)$$

where h is water vapor expressed in g/cm$^2$, $\rho_w$ is the density of water, i.e., 1 g/cm$^3$, g is the acceleration of gravity, i.e., 9.8 m/s$^2$, and $P_0$ is water pressure.

In this case, the atmospheric transmittance calculated at the atmospheric transmittance calculation step S110 is used as an input value to generate a temperature difference image, and thus it is important to maximally accurately calculate the atmospheric transmittance.

The reference temperature estimation step S120 is the step of estimating reference temperature at a reference location set in the target area as desired.

In this case, the reference temperature may be estimated by approximately observing land surface temperature from the infrared image, or may be observed via field observation. However, precise reference temperature is not required for the estimation of land surface temperature lapse rate based on elevation using an infrared image according to the present invention, and thus it is easier to estimate the reference temperature from an infrared image than from an actually measured value. Different methods of estimating land surface temperature from an infrared image may be applied according to the characteristics of infrared sensors. For example, in the case of Landsat TM infrared images, methods of estimating land surface temperature that are generally used may be basically classified into a mono-window algorithm and a single-channel algorithm. It is known that the mono-window algorithm can estimate land surface temperature simpler and has a lower precision of ±2.41 K than the single-channel algorithm. In contrast, it is known that the estimation of reference land surface temperature using the single-channel algorithm has a precision of ±0.56 K and can perform more precise measurement than the mono-window algorithm. Since the present reference temperature estimation step does not require precise land surface temperature, all the two methods are available. The single-channel algorithm and the mono-window algorithm are technologies well known in the art to which the present invention pertains.

The temperature difference image generation step S130 is the step of calculating a temperature difference from a desired point and then generating a temperature difference image, i.e., the step of calculating a temperature difference from the atmospheric transmittance calculated at the atmospheric transmittance calculation step S110 and the reference temperature estimated at the reference temperature estimation step S120 and then generating a temperature difference image. The temperature difference is obtained by obtaining the difference between reference land surface temperature $T_S^{ref}$ and target land surface temperature $T_S^{target}$, which may be expressed by Equation 4 below:

$$dT_S = \frac{K_2}{\ln\left(\frac{K_1}{\frac{dL_\lambda}{\varepsilon_\lambda^{ref} \tau_\lambda} + \frac{K_1}{\exp\left(\frac{K_2}{T_S^{ref}}\right) - 1}} + 1\right)} - T_S^{ref} \quad (4)$$

where $dT_S$ is the temperature difference between the reference land surface and the target land surface, $K_1$ and $K_2$ are constants based on wavelengths used in the infrared image, $dL_\lambda$ is the difference between the radiance on the reference land surface and the radiance on the target land surface, $\varepsilon_\lambda$ is the emissivity of an object and may be assumed to be 0.99 because it is targeted at only a vegetation area, $\tau_\lambda$ is the transmittance calculated at the atmospheric transmittance calculation step S110, and $T_S^{ref}$ is the land surface temperature estimated at the reference temperature estimation step S120. Constants $K_1$ and $K_2$ are defined as $K_2 = 2hc/k\lambda$, and $K_1 = 2hc^2\lambda^{-5} K_2$, respectively, according to the wavelength. $\lambda$ is the effective wavelength band of the target image, h is 6.626068×10$^{-34}$ J·s, k is 1.38066×10$^{-23}$ J/deg, and c is 2.997925×108 m/s. For example, in the case of Landsat5 TM, $K_1$ is defined as 607.76 and $K_2$ is defined as 1260.56, and, in the case of Landsat7 ETM+, $K_1$ is defined as 666.09 and $K_2$ is defined as 1282.71.

The precision of the temperature difference image is determined by the precision of the estimated reference temperature and the precision of the atmospheric transmittance, i.e., input data. FIGS. 4 and 5 show the results of the error sensitivity analysis of temperature differences estimated using Equation 4 according to an embodiment of the present invention. In FIGS. 4 and 5, the lateral axes represent the precision of water vapor and errors in the estimation of the reference temperature, respectively, and the vertical axes represent errors in the temperature difference based on the precision. When the error range of the water vapor was ±0.302 g/cm$^2$ and the radiance differences were 0.2, 0.5 and 1.0 as a result of the error sensitivity analysis, errors of about ±0.06 K, ±0.15 K and ±0.30 K were exhibited. Furthermore, when the error range of the land surface temperature was ±2.41 K and the radiance differences were 0.2, 0.5 and 1.0, errors of about ±0.037 K, ±0.089 K and ±0.168 K were exhibited. When the error range of the land surface temperature was ±0.56 K, errors of about ±0.008 K, ±0.020 K and ±0.038K were exhibited. This indicates that the present invention can estimate relative temperature at higher precision that the land surface temperature estimation method.

Figure 6:
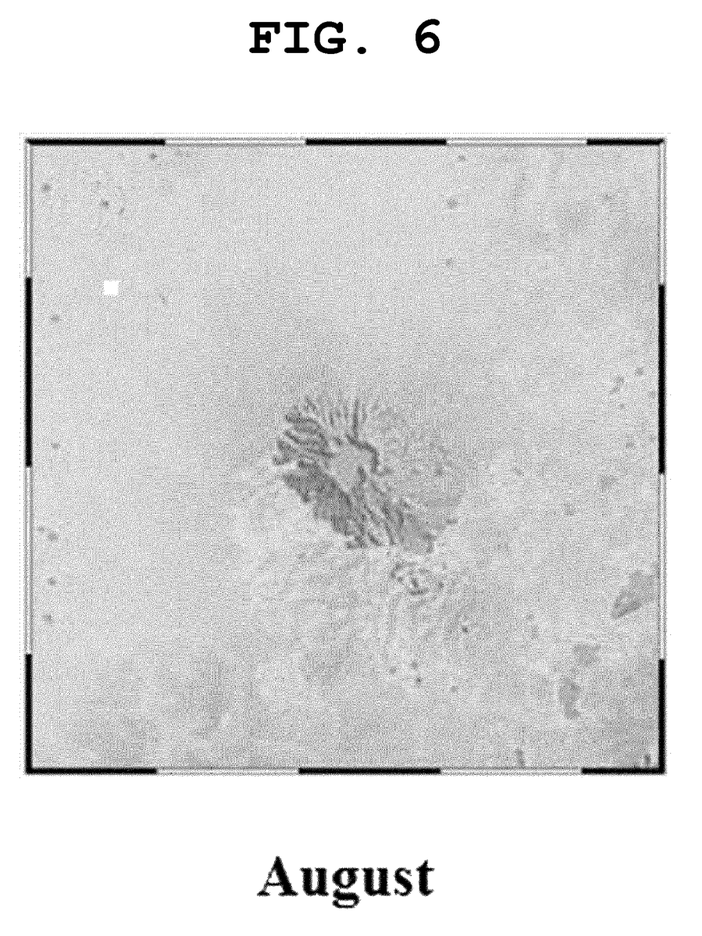
FIGS. 6 to 8 are images showing temperature difference images generated from infrared images via the method of estimating land surface temperature lapse rate using an infrared image according to the embodiment of the present invention.
Figure 7:
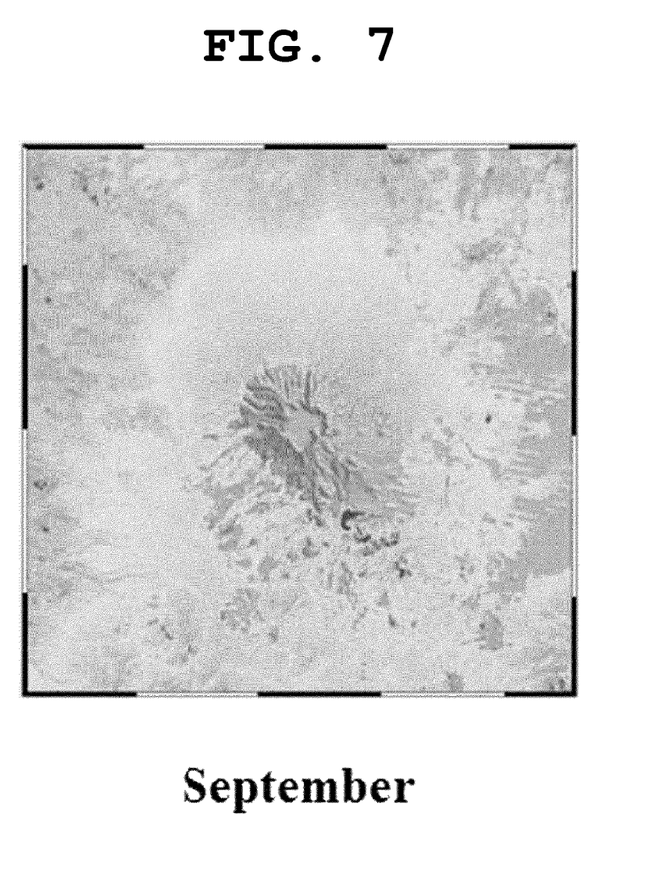
Figure 8:
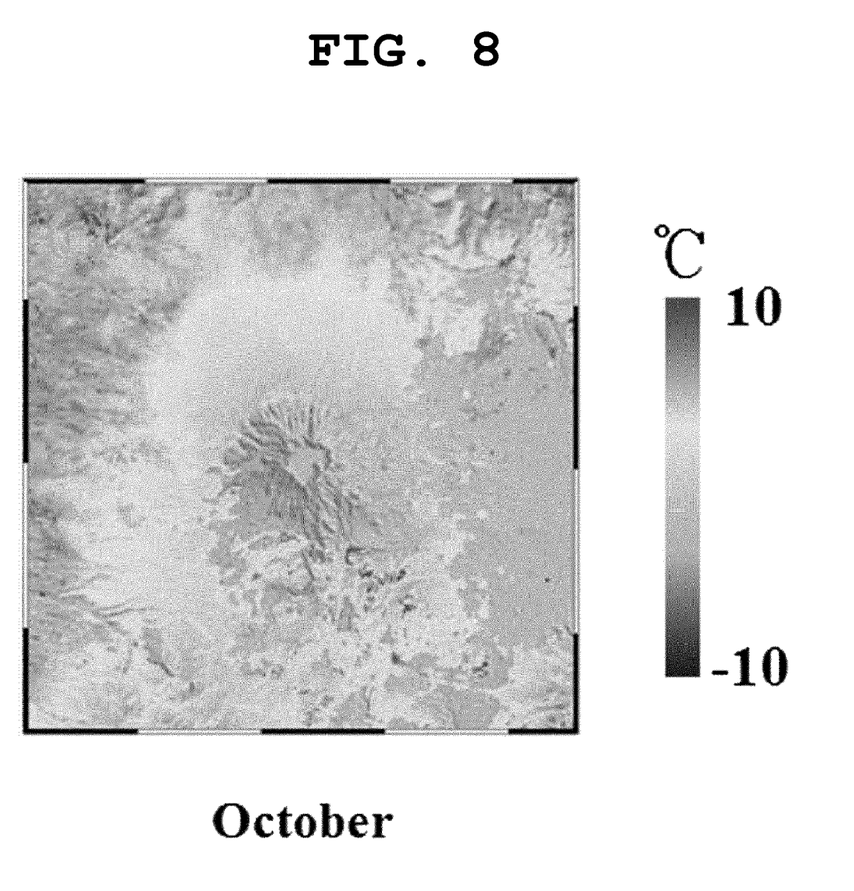

FIGS. 6 to 8 are temperature difference images based on periods of a year generated from Landsat infrared images of a mid-latitude area according to an embodiment of the present invention. It can be seen that the temperature difference increases in the direction from FIG. 6 to FIG. 8 because the period becomes close to the winter. These temperature difference images may enable a precise temperature difference to be estimated by obtaining the difference between the temperatures of the land surfaces, rather than by estimating a direct land surface temperature, unlike in the calculation of the temperature of a land surface.

The land surface temperature lapse rate estimation step S140 is the step of estimating temperature lapse rate from the temperature difference image and a Digital Elevation Map (DEM), i.e., the step of estimating land surface temperature lapse rate from the temperature difference image, generated at the temperature difference image generation step S130, and a DEM in the same area via linear regression analysis while using an elevation-based temperature difference distribution. For this purpose, the DEM is re-sampled such that it has the spatial resolution of the temperature difference image, elevation-based temperature difference data is generated from the DEM h and the temperature difference dT, and a linear regression curve, such as that of Equation 5 below, is obtained:

$$dT = a \cdot h + b \quad (5)$$

where dT is the temperature difference, h is the elevation, and a and b are the parameters of the linear regression curve.

Once the linear regression curve has been calculated, the land surface temperature lapse rate based on the elevation may be obtained from a of the parameters of the linear regression curve. FIGS. 9 to 11 are graphs showing elevation-based temperature difference distributions and land surface temperature lapse rates according to an embodiment of the present invention. FIGS. 9 to 11 are scattergrams that are shown with the DEM on the X axis and the temperature difference data on the Y axis, from which elevation-based linear changes may be determined. FIG. 9 indicates that the land surface temperature lapse rate of August is −0.31° C./100 m, FIG. 10 indicates that the land surface temperature lapse rate of September is −0.54° C./100 m, and FIG. 11 indicates that the land surface temperature lapse rate of October is −0.82° C./100 m.

Furthermore, air temperature-based land surface temperature lapse rate may be obtained from a linear regression curve, such as that of Equation 6 below:

$$r_T = c \cdot T_{air} + d \quad (6)$$

where $r_T$ is the temperature lapse rate, $T_{air}$ is the air temperature, and c and d are variables of the linear regression curve.

Once the linear regression curve has been calculated, a change in air temperature-based land surface temperature lapse rate may be obtained from c of the parameters of the linear regression curve. Such a change in land surface temperature lapse rate enables season-based land surface temperature lapse rate to be calculated. FIG. 12 is a graph showing changes in land surface temperature lapse rate based on air temperature according to an embodiment of the present invention. In FIG. 12, the lateral axis represents air temperature images when the images were photographed, and the vertical axis represents land surface temperature lapse rates estimated from the present invention. The results of linear regression analysis, such as those of Equation 6, indicate that c is 0.04 and a determination coefficient is 0.84, which indicates that the land surface temperature lapse rate based on the air temperature may be precisely estimated.

The method of estimating land surface temperature lapse rate using an infrared image according to the present invention is advantageous in that land surface temperature lapse rate can be estimated using the relationship between the emissivity and atmospheric effects of land surfaces in an image, thereby being able to be used in various fields, such as the generation of a land surface temperature lapse rate diagram, the precise estimation of a change in temperature attributable to a weather change, the observation of a risk involved with a road in an alpine area, the analysis of the ecological system of an alpine area, etc.

While the present invention has been described in conjunction with specific details, such as specific elements, and limited embodiments and diagrams above, these are provided merely to help an overall understanding of the present invention. The present invention is not limited to these embodiments, and various modifications and variations can be made based on the foregoing description by those having ordinary knowledge in the art to which the present invention pertains.

Accordingly, the technical spirit of the present invention should not be determined based on only the described embodiments, and the following claims, all equivalents to the claims and equivalent modifications should be construed as falling within the scope of the spirit of the present invention.

What is claimed is:

1. A method of estimating land surface temperature lapse rate using an infrared image, comprising:
    collecting radiant energy radiated from a land surface in the infrared image using an infrared sensor;
    extracting a normalized difference vegetation index (NDVI) image from the infrared image;
    generating an estimated radiant temperature based on at least one of the NDVI image and the radiant energy collected from the infrared sensor;
    selecting a target area in the infrared image for estimation of the land surface temperature lapse rate according to the estimated radiant temperature;
    calculating atmospheric transmittance of the target area;
    estimating reference temperature at a reference location set in the target area;
    calculating a temperature difference from the atmospheric transmittance and the estimated reference temperature, and generating a temperature difference image;
    estimating the land surface temperature lapse rate from the temperature difference image and a Digital Elevation Map (DEM) in an identical area using an elevation-based temperature difference distribution; and
    calculating an air temperature-based land surface temperature lapse rate using a linear regression curve according to an equation as follows:

$$r_T = c \cdot T_{air} + d,$$

wherein $r_T$ is the estimated land surface temperature lapse rate, $T_{air}$ is the air temperature, and c and d are variables of the linear regression curve.

2. The method of claim 1, wherein the estimating land surface temperature lapse rate comprises estimating the land surface temperature lapse rate via linear regression analysis.

3. The method of claim 2, wherein the estimating land surface temperature lapse rate comprises:
    re-sampling the DEM so that it has to have spatial resolution of the temperature difference image;
    generating elevation-based temperature difference data from the DEM and the temperature difference; and
    calculating the linear regression curve via the temperature difference data.

4. The method of claim 1, wherein the calculating atmospheric transmittance is performed to minimize atmospheric effects of the infrared image.

5. The method of claim 1, wherein the estimating reference temperature comprises approximately observing land surface temperature from the infrared image and then estimating the reference temperature, or observing the reference temperature via field observation.

\* \* \* \* \*